(No Model.)
B. C. LANNEN.
CORN OR SEED PLANTER.
No. 545,700. Patented Sept. 3, 1895.
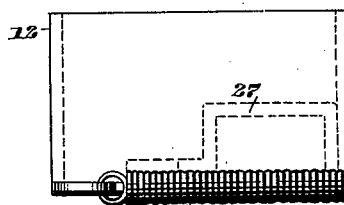
Fig. 2.
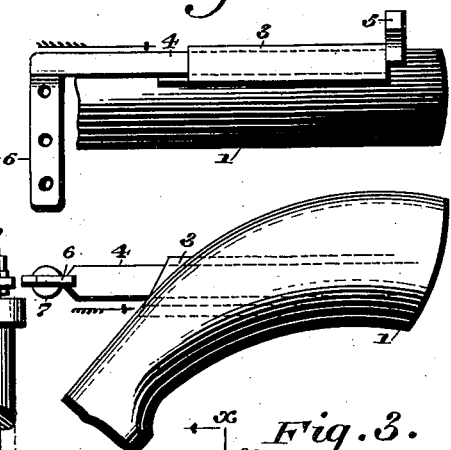
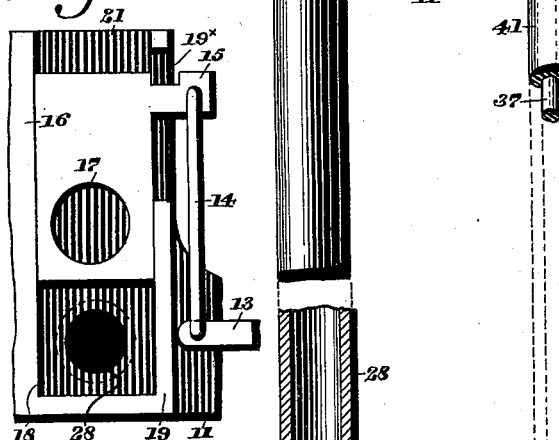
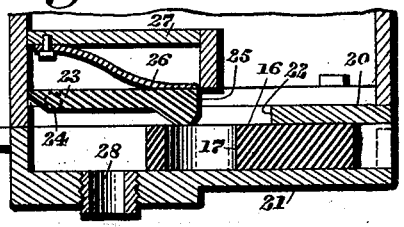
Fig. 6.
Fig. 4.
WITNESSES:
P. H. Aagle.
E. H. Fairbank.
INVENTOR
Bernard C. Lannen.
BY Joshua␣R.␣Biedersheim
ATTORNEY.

UNITED STATES PATENT OFFICE.

BERNARD C. LANNEN, OF AMBOY, ILLINOIS.

CORN OR SEED PLANTER.

SPECIFICATION forming part of Letters Patent No. 545,700, dated September 3, 1895.

Application filed January 31, 1895. Serial No. 536,800. (No model.)

*To all whom it may concern:*

Be it known that I, BERNARD C. LANNEN, a citizen of the United States, residing at Amboy, in the county of Lee, State of Illinois, have invented a new and useful Improvement in Corn or Seed Planters, which improvement is fully set forth in the following specification and accompanying drawings.

My invention consists of a novel construction of a corn or seed planter which is capable of general adaptation but which is especially adapted to be attached to a cultivator or plow of any construction for the purpose of replanting corn, the invention being especially adapted to be employed in connection with the first or second cultivation of said corn, to replant vacant hills without in any manner interfering with or hindering the cultivation of the other corn, provision being made for rendering the device operative without interference with the manipulation of the cultivator.

It also consists of novel details of construction, all as will be hereinafter set forth.

Figure 1 represents a side elevation of a seed-planter embodying my invention, a portion of the same being shown in section on line $y\ y$, Fig. 6. Fig. 2 represents a plan view of a portion of the cultivator-handle, showing the device which throws the planter into operation. Fig. 3 represents a plan view of the upper portion of the device, showing especially the hopper or receptacle for the seed. Fig. 4 represents a section on line $x\ x$, Fig. 3, viewed in the direction of the arrows. Fig. 5 represents a plan view of the upper dropper-plate or measuring device for the hopper seen in Fig. 3. Fig. 6 represents a plan view of the under side of the lower dropper-plate and the actuating mechanism therefor.

Similar numerals of reference indicate corresponding parts in the several figures.

Referring to the drawings, 1 designates the handle of the cultivator to which the planter is to be attached, and 2 designates the shovel of the latter, which it will be understood corresponds to the shovel that runs nearest the corn row on preferably the right-hand side of the plow or cultivator, the handle 1 being the right-hand handle in the present instance.

3 designates a guide which is attached to preferably the outside of the handle, in which guide is retained the bar 4, which has the finger-piece 5 attached to one end thereof at an angle, as seen in Fig. 2.

6 designates an arm extending at an angle to the bar 4, to which is attached one end of the chain, rod, or other connection 7, the other end thereof being secured to the arm 8 of the elbow lever 9, which is attached to the upper extremity 10 of the shaft 37, which passes through the shelf 11 of the hopper 12, said shelf being provided with a suitable stop 42, whereby the movement of said arm 8 is limited, as is evident. The other arm 13 of said elbow-lever 9 has one end of a link 14 pivotally attached to it, while the other end of said link is connected to the arm 15 of the upper dropper-plate 16, Fig. 5, which has the hole 17 therethrough, by means of which the requisite quantity of seed is measured. The said upper dropper-plate is prevented from lateral or vertical movement by the guides 18 and 19 and the stationary plates 20 and the base 21 of said hopper, the movement of said dropper-plate being limited by the contact of the arm 15 with the walls of the slot $19^\times$ in the guide 19, as will be understood from Fig. 5. The plate 20 is cut out at 22, as seen in Figs. 3 and 4, so that when the dropper-plate 16 is moved to nearly its extreme rear position, the hole 17 will be nearly coincident with the cut-out portion 22, and the hole 17 can then become filled with a predetermined quantity of seed. To prevent sticking or binding of the plate 16, the device shown in Fig. 4 is employed, consisting of the plate or tongue 23 pivoted at 24 and having the head 25, which overhangs the said plate 16 and is kept in contact with the latter by means of the spring 26, which has one end contacting with said tongue, its other end being attached to the housing or casing 27, which incloses both the spring and tongue.

28 designates an upright conduit, which has one end opening into the seed receptacle 12 at a point below said housing 27, while the lower end of said conduit communicates with the frame 29, whose width is seen in the plan view in Fig. 6, the same consisting of the top portion 30 and the sides 31, a recess or chamber 32 being formed in the lower portion of said frame 29, in which is located the lower dropper-plate 33, which has the hole 34 therethrough, said plate being actuated by means of the link 35, which in the present instance works in a recessed portion of said plate, said link being pivotally connected to the rock arm 36, which is actuated by the shaft 37, whose upper end 10 passes through the shelf 11, as stated, and has the elbow-lever 9 attached thereto, whereby it will be seen that a movement of said elbow-lever simultaneously imparts a movement to the upper and lower dropper-plates 16 and 33, as will be explained, the spring 38, which has one end attached to the arm 8 and the other to the lug 39, holding the parts normally in the proper position. The shovel 2 is attached to the front part of the frame 29 in any convenient or suitable manner. The lower dropper-plate 33 and the link 35, &c., are partially inclosed when in position by means of the casing 40, which is suitably attached to the under side of the frame 29, and which terminates under the conduit 28, as best seen in Fig. 1, the plate 33 being supported and guided in suitable ways, as will be understood from Fig. 6.

41 designates an inclosing casing for the shaft 37, whereby the latter is prevented from being hit or otherwise injured.

The operation is as follows: The seed is placed in the receptacle or hopper 12 and a predetermined portion thereof will fall into the hole 17 of the upper dropper-plate 16, as will be understood from Fig. 4, the normal position of said plate being indicated therein, the latter being held in position by the spring 38. When the cultivator in its forward movement reaches a missing or vacant hill of corn, the operator pulls the bar 4 toward him in the direction of the arrows, Figs. 1 and 2, and by means of the intermediate connections the upper dropper-plate will be moved forwardly until the hole 17, which, as will be understood, is full of seed, registers with the opening in the pipe or conduit 28, and the seed falls through the latter upon the lower dropper-plate 33, which, it will be understood, moves simultaneously forward in the direction of the arrow, Figs. 1 and 2, so that the hole 34 is now out of alignment with the conduit 28 and is moved beyond the end of the bottom casing 40, and the seed is thus deposited close to the back of the shovel, so as to be readily covered, whereupon it will be seen that if the finger-piece 5 is released the spring 38 will cause both the upper and lower plates 16 and 33 to move backwardly into the positions seen in Figs. 1, 4, 5, and 6 again, and the seed or corn deposited by said forward movement of the lower dropper-plate in the furrow, caused by the shovel 2, will be covered up by the dirt falling back as said shovel moves forwardly, as stated, it being understood that the movements of the upper and lower dropper-plates are substantially simultaneous, and that during the instant they are occurring the portion of the plow or cultivator to which the device is attached is brought directly over the missing hill of corn, and it will be seen that the requisite quantity of the latter can be dropped and covered without stopping the horses, the bar 4, the guide 3, &c., being preferably attached to the right-hand handle of the plow or cultivator, and the shovel 2 being the one nearest the row of corn on the right-hand side of the plow, as has been stated, it being also noted that when the upper dropper-plate is discharging into the conduit 28 the lower dropper-plate is discharging into the earth, and that said upper dropper-plate is prevented from being clogged by means of the spring-pressed plate 23. In practice I prefer to make the sides of the chamber where the seed is discharged from the lower dropper-plate in the shape of an inverted funnel, that dirt may not accumulate therein, and the lower dropper-plate may be raised to nearly the top of the shovel, if desired, so that it will be less liable to be clogged with dirt, &c.

The planter can be readily attached to existing plows or cultivators, as is evident.

It will also be apparent that various changes may be made by those skilled in the art which will come within the scope of my invention, and I do not therefore desire to be limited to the exact construction I have herein shown and described.

Having thus described my invention, what I claim as new, and desire to secure by Letters Patent, is—

1. In a corn or seed planter, a hopper, an upper dropper plate, a lower frame with a chamber therein, a lower dropper plate, a vertical shaft, mechanism connected with said shaft for operating said plates, a conduit connecting said hopper and chamber, an inclosing casing for said shaft, said parts being combined substantially as described.

2. In a corn or seed planter, the handle having the guide 3, on the side thereof, the bar 4 in said guide having the finger piece 5 at one end, the arm 6 extending from one end of said bar 4, a hopper with the shelf 11, the elbow 9 pivoted to said shelf, the dropper plate 16 with the hole 17 therein, and provided with the arm 15, the link 14 connected with said arm 15 and one limb of said lever, the chain 7 connecting said arm 6 and the other limb of said lever, and a spring connected with said latter mentioned limb and a stationary support, said parts being combined substantially as described.

3. In a corn or seed planter, the frame 29 consisting of the top portion 30, the sides 31, the chamber 32, the conduit 28 leading into said chamber, the dropper plate 33 with the hole 34 therein, means for reciprocating said plate, and the casing 40 attached to the under side of said frame, said parts being combined substantially as described.

BERNARD C. LANNEN.

Witnesses:
JAMES BURNS,
JOHN H. HUBBELL.